United States Patent [19]

Nelson

[11] Patent Number: 4,919,865
[45] Date of Patent: Apr. 24, 1990

[54] COMPOSITE MEMBRANES OF POLY (METHYL METHACRYLATE) BLENDS, THEIR MANUFACTURE AND THEIR USE

[75] Inventor: Joyce K. Nelson, Lexington, Mass.

[73] Assignee: Union Carbide Industrial Gases Technology Corporation, Danbury, Conn.

[21] Appl. No.: 117,639

[22] Filed: Nov. 5, 1987

[51] Int. Cl.$^5$ ............... E01D 13/00; E01D 13/04
[52] U.S. Cl. ............... 264/45.1; 210/654; 210/655; 210/500.29; 210/500.42; 264/DIG. 48; 264/DIG. 62
[58] Field of Search ............... 264/41, 45.1, DIG. 48, 264/DIG. 62; 55/158, 16; 210/500.28, 500.42, 634, 644, 649–654, 655, 500.29, 500.3, 500.31, 500.32

[56] References Cited

U.S. PATENT DOCUMENTS

| | | | |
|---|---|---|---|
| 3,892,665 | 7/1975 | Steigelmann et al. | 210/500.38 |
| 4,214,020 | 7/1980 | Ward et al. | 210/490 |
| 4,230,463 | 10/1980 | Henis et al. | 55/16 |
| 4,459,210 | 7/1984 | Murakami et al. | 210/500.42 |
| 4,662,905 | 5/1987 | Matsuura et al. | 55/158 |
| 4,664,481 | 5/1987 | Anazawa et al. | 264/177.1 |

Primary Examiner—Frank Sever
Attorney, Agent, or Firm—A. H. Fritschler

[57] ABSTRACT

Composite membranes are disclosed having a separation layer comprised of a mixture of poly(methy methacrylate) or a copolymer thereof and at least one cellulosic derivative resulting in enhanced separation and permeating characteristics of the overall composite membrane. Processes for making these composite membranes and the methods of using them are also disclosed. The membranes are particularly useful in gas separation applications and are most suited for the separation of hydrogen from a hydrogen containing stream.

60 Claims, No Drawings

COMPOSITE MEMBRANES OF POLY (METHYL METHACRYLATE) BLENDS, THEIR MANUFACTURE AND THEIR USE

BACKGROUND OF THE INVENTION
1. Field of the Invention

This invention pertains to the field of semi permeable membranes for separating at least one component of a fluid mixture. More specifically, the present invention relates to composite membranes having a separation layer comprised of a mixture of poly(methyl methacrylate) or a copolymer thereof and at least one cellulosic derivative resulting in the composite membrane having enhanced separation and permeating characteristics.

2. Discussion of Related Art

Permeable membranes capable of separatinq at least one elected component from a fluid mixture, either gas or liquid, are considered in the art as a convenient, potentially highly advantageous means for achieving desirable fluid separation and/or concentration.

To achieve a selective separation, the membrane must exhibit less resistance to the transport of one or more components than that of at least one other component of the mixture. Thus, selective separation can provide preferential depletion or concentration of one or more desired components in the mixture with respect to at least one other component and therefore provide a product having a different proportion of the one or more desired components to the at least one other component than that proportion in the mixture.

However, in order for selective separation of one or more desired components by the use of separation membranes to be commercially attractive, the membranes must not only be capable of withstanding the conditions to which they may be subjected during the separation operation, but also must provide an adequately selective separation of the one or more desired components and a sufficiently high flux, i.e., permeation rate of the permeate per unit surface area, so that the use of the separation procedure is carried out on an economically attractive basis. Separation membranes which exhibit adequately high selective separation, but undesirably low fluxes, may require such large separatinq membrane surface area that the use of these membranes is not economically feasible. Similarly, separation membranes which exhibit a high flux, but low selective separation, may also be commercially unattractive.

Accordingly, work continues to develop separation membranes which can provide both an adequately selective separation of the one or more desired components and a sufficiently high flux such that the use of these separation membranes on a commercial basis is economically feasible.

Membranes are generally utilized for the separation of fluid mixtures in which the feed and the resulting raffinate and permeate do not undergo a phase change during the permeation process.

Membranes are also desired, however, in fluid separation processes that involve a phase change of one or more components of the mixture to be separated. The feed and the permeate streams are thus alternately in the liquid and gaseous state in such processes, with gas being present on one side of the membrane. An example of such a process is pervaporation through membranes, which is particularly useful in the separation of liquids from their azeotrope solvent mixtures, and wherein liquid is present on the feed side of the membrane. Another such process is perstruction, wherein liquid is present on the permeate side of the membrane.

Membranes have been fabricated in various shapes, such as (1) flat sheets which may be supported in a typical plate and frame structure similar to a filter press; (2) flat sheets rolled into spirals with spacing materials interleaved with the membrane and the assembly sealed to provide spiroidal channels permitting the passage of the feed on one side of the coiled membrane to the opposite side of the membrane; (3) as tubes lining the inner surface of a reinforced braid, the braid itself at times being a component in a larger tube; (4) in the form of open ended hollow fibers so organized and sealed into header plates as to provide a separation of the flows over the external surfaces of the hollow fibers from any flow within the bores of the hollow fibers ensuinq by virtue of passage of permeant across the membrane.

Various types of permeable membranes have been proposed in the art for carrying out a variety of fluid separation operations. Such membranes can generally be classified as being of the (1) isotropic, (2) asymmetric, or (3) composite type. The so-called isotropic and asymmetric type membranes are comprised essentially of a single permeable membrane material capable of selectively separatinq desired components of a fluid mixture. Isotropic membranes have the same density throughout the thickness thereof. Such membranes generally have the disadvantage of low permeability, i.e., low permeate flux, due to the relatively high membrane thickness necessarily associated therewith. Asymmetric membranes are distinguished by the existence of two distinct morphological regions within the membrane structure. One region comprises a thin, dense semipermeable skin capable of selectively permeating one component of a fluid mixture. The other region comprises a less dense, porous, non-selective support region that serves to preclude the collapse of the thin skin region of the membrane under pressure.

Composite membranes generally comprise a thin layer or coating of a suitable permeable membrane material superimposed on a porous substrate. The separation layer, which determines the separation characteristics of the composite structure, is advantageously very thin so as to provide the desirably high permeability referred to above. The substrate only serves to provide a support for the thin membrane layer positioned thereon and has substantially no separation characteristics with respect to the fluid mixture being separated or concentrated.

The problems associated with the preparation of composite membranes are many. Most significantly, however, is the challenge of finding a material for use as the separation layer for a given application, which material not only displays high permeablity and high selectivity, but additionally possesses the necessary thermomechanical properties which makes it a good film former to consistently form a continuous thin film without defects or pinholes and be flexible enough for us in a composite membrane.

Accordingly, a need still exists for finding new materials suitable for use as separation layers in a composite membrane having high selectivity without sacrifice in permeation rate, while at the same time having the necessary thermomechanical characteristics necessary for making a thin, continuous film.

SUMMARY OF THE INVENTION

Applicant has discovered a new combination of materials for use as a separation layer in a composite membrane which provides enhanced separation and permeating characteristics.

More particularly, Applicant has discovered that a blend of poly(methyl methacrylate) or a copolymer thereof that contains at least 50% by weight of poly(methyl methacrylate) and at least one cellulosic derivative will provide a membrane forming material with an advantageous combination of separation and permeation characteristics and superior film-forming properties. When this blend is utilized as a coatinq material in conjunction with a support layer, a composite membrane is provided having high permeation rates in addition to excellent separation factors. This composite membrane may be used for selectively permeating at least one or more readily permeable components of a fluid mixture in gas, pervaporation or perstruction separation operations.

Polymers are typically not miscible with one another generally resulting in the formation of non-uniform films when cast as a mixture, having separate regions of each polymer, respectively. Applicant, however, has discovered that poly(methyl methacrylate) or a copolymer thereof and at least one cellulosic derivative, particularly cellulose acetate, actually complement one another to provide a blend having excellent thermomechanical properties. This novel blend has excellent film forming characteristics capable of forming a substantially uniform, thin, continuous film layer in conjunction with high selectivity and high flux. As used herein a "copolymer" of poly(methyl methacrylate) is understood to mean a copolymer containing at least 50% by weight of poly(methyl methacrylate).

More specifically in regard to how the components of this unique blend complement one another, it is noted that poly(methyl methacrylate), when used as a coating layer by itself, has extremely high separation factors, but very low permeabilities. In addition, poly(methyl methacrylate) by itself exhibits brittleness which is not conducive for forming a thin, defect free film. Moreover, very thin and uniform, continuous films of poly(methyl methacrylate) cannot be consistently produced resulting in a film having small imperfections and/or pinholes leading to undesirable separation factors. In conjunction with the low permeablity of the poly(methyl methacrylate), such defects also significantly decrease the separation factor of the membrane. On the other hand, cellulose derivatives, particularly cellulose acetate, possess generally good separation factors and high permeation rates.

Quite surprisingly, the blend of poly(methyl methacrylate) or a copolymer thereof which contains at least 50% by weight of poly (methyl methacrylate) and the at least one cellulosic derivative produces a material which has unexpectedly high separation characteristics as well as high permeation rates thereby uniquely complementing each other. Thus, the blend retains the high separation characteristics of the poly(methyl methacrylate) as well as the high permeation characteristics of the cellulose derivative, whereas it would have been thought that these respective properties would have been compromised due to the blending of these materials resulting in separation and permeation characteristics which are, at best, no better than the average value of these materials. Instead, the blend surprisingly retains the desireable characteristics of both the poly(methyl methacrate) and the cellulosic derivative.

In the separation of hydrogen from nitrogen, for example, the separation factor of the material comprised of the blend of poly(methyl methacrylate) and cellulose acetate can be as high as twice that of a cellulose acetate composite membrane. Similarly, the permeation rate of the said blend of the present invention can be twice as high as that of a poly methyl methacrylate) composite membrane.

As still a further added benefit, the blend of poly(methyl methacrylate) or copolymer thereof and the at least one cellulosic derivative also enables the consistent production of reproducible, uniform, continuous thin films having substantially no defects of the type associated with poly(methyl methacrylate) alone. It is noted that in his Ph.D. Thesis, University of Texas, Austin, Texas, May, 1985, J. S. Chiou discussed the gas separation characteristics of dense flat sheets of poly(methyl methacrylate). As discussed above, these poly(methyl methacrylate) membranes were reported to have extraordinarily high gas separation factors but exhibited correspondingly low permeability coefficients thereby making poly(methyl methacrylate) unattractive for commercial use. Blends of poly(methyl methacrylate) with styrene acrylonitrile were also prepared.

So too, polymeric blends have also been discussed in the prior art. Blends of cellulose triacetate and cellulose diacetate are disclosed for liquid separation in "Reverse Osmosis Membrane Research" by W.N. King, et al., Plenum Press, New York, 1972, paqe 131. These polymeric blend membranes were used for single-pass desalination of water. In a report prepared for the Office of Water Research and Technology (Funding Agreement No. 14-34-0001 6523, 1977), I. Cabasso and C. N. Tran disclose blends of cellulose acetate with phosphonylated and brominated polyphenylene oxide as useful materials for water desalination.

However, the unexpected results obtained by the present invention as to the substantial compatability and the complementinq manner in which the poly(methyl methacrylate) or copolymer thereof and cellulosic derivatives enhance each other's properties are not taught or suggested within the prior art noted above.

DETAILED DESCRIPTION OF THE INVENTION

The new membrane forming materials of the present invention, which may be used as a separation layer coatinq in conjunction with a porous support layer to form a new and enhanced composite membrane capable of selectively permeating at least one or more readily permeable components of a fluid mixture in gas, pervaporation or perstruction separation operations, comprises a mixture of poly(methyl methacrylate) or a copolymer thereof and at least one cellulosic derivative.

Poly(methyl methacrylate) is a well known component and can readily be commercially obtained or synthesized by one skilled in the art. Poly(methyl methacrylate) can be prepared to vary in tacticity, namely, as syndiotactic, atactic, or isotactic, and all are within the atactic form is more readily available and therefore economically desirable.

A discussion of the various forms of poly(methyl methacrylate) is found in "Low-frequency Thermomechanical Spectrometry Of Polymeric Materials: Tactic Poly(Methyl Methacrylates)" by J. K. Gillham, et al., Journal Of Applied Polymer Science, Volume 21, 401-424 (1977).

A copolymer as poly(methyl methacrylate) may also be used in the present invention. Suitable materials for co-polymerization with poly(methyl methacrylate) are those which do not substantially reduce the separation characteristics of poly(methyl methacrylate). Generally, applicable materials for co-polymerization with methyl methacrylate are those which form a co-polymer having a glass transition temperature which is no less than about 20 % of the glass transition temperature of poly(methyl methacrylate) alone. If the glass transition temperature of the copolymer is substantially less than the class transition temperature of poly(methyl methacrylate), then the copolymer will generally have separation properties which are relatively less than that of the poly(methyl methacrylate) alone.

Applicable copolymers include poly(methyl methacrylate acrylonitrile), discussed in J. Hiemeleers, Chem., 47, 7, 1961; poly(methyl methacrylate-vinyl chloride) discussed in Y. Minoura, Chemical AbstractS, 68, 1749, 1965 and 64, 11337, 1966; poly(methyl methacrylate-methacrylonitrile), poly(methyl methacrylate-vinyl acetate), nd poly(methyl methacrylate methyl-alpha chloroacrylate), all discussed in U.S. Patent Nos. 3,069,380 and 3,069,381; poly(methyl methacrylate-acrylonitrile) discussed in British Patent No. 805,921; poly(methyl methacrylate-pentafluorophenyl methacrylate); and poly(methyl methacrylate-styrene). In addition, suitable materials that may be copolymerized with the methyl methacrylate are ethyl methacrylate, n-butyl methacrylate, iso-butyl methacrylate, and the like.

Preferably, the amount of poly(methyl methacrylate) in the copolymer is at least about 50 % by weight and more preferably is at least about 80 % by weight.

The cellulosic derivatives applicable in the present invention comprise cellulose acetate, cellulose acetate butyrate, cellulose propionate, cellulose acetate propionate, cellulose butyrate, and the like. All of these cellulose derivatives are well known in the art and can be readily obtained commercially or synthesized by one skilled in the art.

In a preferred embodiment, cellulose acetate is employed in conjunction with the poly(methyl methacrylate). Preferably, the cellulose acetate has a degree of acetylation of greater than 2.0, and more preferably 2.0 to 2.9, where the degree of acetylation varies between 0 for unsubstituted cellulose to 3 for the completely substituted material.

Generally, cellulose acetate is prepared from cellulose by acetylation with acetic anhydride, acetic acid and a catalyst, such as sulfuric acid. During acetylation, which is accompanied by some hydrolysis, the desirable degree of polymerization range (for membranes) of between 100 and 200is attained as a result of acid catalyzed depolymerization of the cellulose backbone. The other cellulose derivatives are prepared in a substantially similar manner using the corresponding acids and anhydrides.

In order to prepare the coatinq blend, the poly(methy methacrylate) or copolymer thereof and at least one of the cellulosic derivatives must be dissolved in one or more solvents so as to form a solution. From this solution, utilizing conventional preparation techniques, dense fibers, asymmetric membranes, composite membranes, and the like, may be prepared. Thus, as will be discussed more fully hereinbelow, it is by means of this solution that a coatinq is applied to a porous substrate (which acts as a support layer in the composite membrane) and forms a separation layer. This is generally performed by passing or immersing the porous substrate surface through the solution.

Any suitable solvent or mixture of solvents for the blend of poly(methyl methacrylate) or copolymer thereof and the at least one cellulosic derivative can be used and those skilled in the art will appreciate and know to select the preferred solvents that are suitable for this blend of materials. Generally, the solvent is one which will dissolve the poly(methyl methacrylate) or copolymer thereof and the cellulosic derivative materials and can be inorganic or organic and able to produce a homogeneous or uniform solution The solvent used to prepare the solution may also be a mixture of one or more solvents that will dissolve the poly(methyl methacrylate) or copolymer thereof and cellulose derivative materials and one or more non-solvents for these materials which are used as additives to the solution. Such solvent mixtures are generally preferred. The important consideration, whether a single solvent or a mixture of solvent and non-solvent is used, is that the solution is preferably essentially homogeneous and uniform.

When the solution of poly(methyl methacrylate) and cellulose derivative is intended for use in the preparation of a composite membrane, the solution should be of a low enough viscosity that it will be easily applied as an even coating on the porous substrate and preferably wets the porous substrate. The viscosity at application temperature can vary from less than about 50 centipoise and is generally from about 0.05 to about 10 to 20 centipoise.

The concentration of film-forming material in the solution can vary from about 0.25 to about 5% by weight of the solution.

Illustrative of the solvents that can be used to prepare the solution are as follows: selective aromatic hydrocarbons, e.g., toluene, xylene, etc.; ketones, e.g., acetone, dimathyl ketone, diethyl ketone, methyl ethyl ketone, etc.; acids, e.q., acetic acid, propionic acid, etc.; esters, e.g. ethyl acetate, etc.; some halogenated or nitrated organic solvents, e.q. nitromethane; and mixtures thereof may also be used.

Preferably, the solvents for the poly(methyl methacrylate) and cellulosic derivatives include nitromethane alone or in combination with a $C_1$-$C_4$ aliphatic alcohol; acetone alone or in combination with a $C_1$-$C_4$ aliphatic alcohol, and most preferably, is a mixture of acetic acid with $C_1$-$C_4$ aliphatic alcohols, most preferably isopropanol, or a mixture of acetic acid with $C_1$-$C_4$ aliphatic alcohols and water.

On a weight basis, the ratio of poly(methyl methacrylate) or copolymer thereof to cellulosic derivative used to prepare the solution is generally in the range of from about 10:90 to 90:10, preferably about 30:70 to 70:30, and most preferably about 50:50.

The substrate upon which the separation layer is coated may be in flat sheet, hollow fiber, or other desired physical form, with the hollow fiber form being the most preferred.

Those skilled in the art will appreciate that porous substrates may be prepared in any of these forms and they are aware of the many methods available for their production and their ready commercial availability.

The invention is further described herein, for convenience of description, with particular reference to hollow fiber or polysulfone hollow fiber composite membranes. It will be understood, however, that the scope of the invention is not limited to the use of composite membranes in hollow fiber form. It is within the scope of the invention to employ any composite membrane composition prepared as herein for use in desired fluid separation operations.

The hollow fiber membranes typically used in the art have continuous channels for fluid flow extending between the exterior and interior surfaces. Frequently, the pores have an average cross-sectional diameter less than about 20,000 and in some hollow fibers the cross-sectional diameter is less than about 1,000 or 5,000 angstroms. Advantageously, the walls of the hollow fibers are sufficiently thick that no special apparatus is required for their handling. Frequently, the hollow fibers may have outside diameters of about 20 to 1,000 microns, generally about 50 to 1,000 microns, and have walls of at least about 5 microns in thickness. The wall thickness in some hollow fibers may be up to about 200 or 300 microns.

In order to provide desirable fluxes through the hollow fibers, particularly using those hollow fibers having walls at least about 50 microns in thickness, the hollow fibers may have a substantial void volume. Voids are regions within the walls of the hollow fibers which are vacant of the material of the hollow fibers. Thus, when voids are present, the density of the hollow fiber is less than the density of the bulk material of the hollow fiber. Often, when voids are desired, the void volume of the hollow fibers is up to about 90, generally about 10 to 80, and sometimes about 20 or 30 to 70, percent based on the superficial volume, i.e., the volume contained within the gross dimensions, of the hollow fiber. The density of the hollow fiber can be essentially the same throughout its thickness, i.e., isotropic, or the hollow fiber can be characterized by having at least one relatively dense region within its thickness in barrier relationship to fluid flow through the wall of the hollow fiber, i.e., the hollow fiber is anisotropic. Generally, a relatively dense region of anisotropic hollow fibers is substantially at the exterior or interior of the hollow fiber, and preferably, the coatinq contacts this relatively dense region.

The material used for the hollow fiber may be a solid natural or synthetic substance. The selection of the material for the hollow fiber may be based on the heat resistance, solvent resistance, and/or mechanical strength of the hollow fiber, as well as other factors dictated by the intended separation process in which it will be used and the operating conditions to which it will be subjected. The hollow fibers may be flexible or substantially rigid. The material used for the hollow fibers may be inorganic to provide, e.g., hollow class, ceramic, sintered metal, or the like, fibers. In the case of polymers, both addition and condensation polymers which can be fabricated in any suitable manner to provide porous hollow fibers, are included. Generally organic, or organic polymers mixed with inorganic materials (e.q., fillers), are used to prepare the hollow fibers. Typical polymers can be substituted or unsubstituted polymers and may be selected from polysulfones, such as bisphenol A polysulfone (sold under the mark "Udel" by Union Carbide Corporation or polyether sulfone (sold under the mark "Victrex" by Imperial Chemical Industries); polyacrylonitriles; polycarbonates; cellulose; polyamides and polyimides, including aryl polyamides and aryl polyimides; polyethers; poly(arylene oxides) such as poly(phenylene oxide); polyurethanes; polyesters (including polyarylates), such as poly(ethylenr terephthalate). etc.; polysulfides; polymers from monomers having alpha-olefinic unsaturation other than mentioned above such as poly(ethylene), poly(propylene), poly(butene-1), poly(4-methyl 1-pentene), polyvinyls, e.g., poly(vinyl chloride), poly(vinyl fluoride), poly(vinylidene chloride), poly(vinylidene fluoride), and the like.

Substrates prepared from polysulfone are particularly preferred.

The polysulfone or other hollow fiber substrates employed in the practice of particular embodiments of the present invention can be prepared in accordance with conventional techniques well known in the art. Hollow fibers are generally spun from a dope composition of the desired fiber polymer, quenched, washed and dried. As disclosed by Cabasso, et al. in "Composite Hollow Fiber Membranes", Journal of Applied Polymer Science, Volume 23, 1509-1525 (1979), and in "Research and Development of NS-1 and Related Polysulfone Hollow Fibers for Reverse Osmosis Desalination of Seawater", Gulf South Research Institute, July 1985, Distributed by National Technical Information Service, U.S. Department of Commerce Publication PB 248,666, polysulfone hollow fibers can be spun from a ternary solution of polysulfone, poly(vinyl pyrrolidone) and dimethylacetamide, with the total polymeric concentration in the solution desirably being 40 to 52 weight %, and the polysulfone/poly(vinyl pyrrolidone) ratio being 1.5:2.0. The well known tube-in-tube jet technique is disclosed as being suitable for the spinning procedure, with water at about 21 C being the preferred outside quench- medium for the fibers. The quench medium in the center of the fiber is desirably air. Quenching is followed by washing the fibers, conveniently with hot water at about 50 to 60° C. Following such washing, the hollow fibers are dried prior to being coated with the separation film layer to form the desired composite membrane. For this purpose, the polysulfone hollow fibers are typically dried by passage through a hot air drying column for a suitable period of time.

The dried polysulfone hollow fiber is coated with the coatinq solution of the present invention containing the poly(methyl methacrylate) and at least one cellulose derivative in a coatinq and drying sequence This coatinq and drying sequence conveniently comprises the technique used and described in the Coplan, et al. patent, U.S. Pat. No. 4,467,001, which is incorporated herein by reference. Thus, the dried hollow fiber is passed through the coating solution contained in a coating vessel, and is then passed through a drier oven and a cure oven for contact with drying air or other suitable gas, and higher temperature curing air or other gas prior to being taken up on a winder or otherwise being processed or stored for eventual incorporation in membrane modules suitable for use in commercial fluid separation operations.

For the coating of polysulfone hollow fibers with a blend of poly(methyl methacrylate) and cellulose acetate, a preferred embodiment of the present invention, it is generally desirable to employ drying temperatures of from about 20° C. to about 120° C. Those skilled in the art will appreciate that it is also possible to dry the separation layer on the support layer without employing the separate curing step described above.

Generally, the thickness of separatinq layer that is coated onto the porous support layer is less than about 0.4 microns, preferably is about 0.2 to about 0.05 microns, and most preferably is less than about 500 angstroms. By weight, the ratio of poly(methyl methacrylate) or copolymer thereof to cellulosic derivatives present in the coatinq is in the range of from about 10:90 to 90:10, preferably about 30:70 to 70:30, and most preferably about 50:50.

In a preferred embodiment of the present invention, the substrate is subjected to a high temperature annealing process. Althouqh it is preferable to anneal the substrate prior to its being coated with the poly(methyl methacrylate) and cellulosic derivative blend of the present invention, the annealinq process may be carried out on the coated substrate as well. The resulting composite membrane formed from such an annealed substrate, when used with the coatinq of the present invention, provides for an even qreater enhancement in both separation and permeation characteristics.

Most importantly, however, the annealing of the substrate provides for an increase in compaction resistance and membrane collapse pressure tolerance. Thus, it is well known that membrane compaction, particularly at high pressure and temperature conditions such as exist with membrane gas separation of, for example, ammonia vent recovery, may cause membrane compaction with the concurrent loss of permeation and separation characteristics or even total membrane collapse. With annealing, however, the substrate shows superior pressure compaction resistance.

More particularly, polysulfone support membranes or other support membranes applicable in the present invention having high class transition temperatures (Tq), e.q., above 100° C., may be annealed at temperatures that are close to their glass transition temperature, typically about 4 to 15° C. below the Tg of the particular support substrate.

The substrates are annealed by exposing them for a very short period of time to high temperature under non solvent and non-swelling environmental conditions.

The annealing process can be asymmetric in nature and can result in mostly surface modification or can further cause modification throuqhout the entire membrane structure. Polysulfone membranes, for example, can be annealed by exposure to high temperature air, or other hot non swelling liquids, or to any other high temperature environment with non solvent, non-swelling characteristics towards the substrate. More specifically, polysulfone fibers may be annealed by drying freshly spun fibers at 115° C. by passage through a hot-air drying column which fibers are then annealed by passing them through another hot-air oven at a temperature of about 182° C. in the case of bis-phenol A polysulfone which is close to its glass transition temperature of about 184° to 186° C. The residence time in the oven is generally about 5 seconds to 4 minutes, preferably about 10 to 30 seconds.

In use, the composite membrane will generally be assembled as part of a membrane separating device. The membrane device is designed to carry out a selective separation of at least one component from a fluid stream mixture. The membrane apparatus will typically consist of an enclosure and a membrane assembly positioned therein. The membrane assembly can be constructed in the form of a spiral wound cartridge, a hollow fiber bundle, a pleated flat sheet membrane assembly, and like assemblies common in the membrane industry. The membrane assembly is constructed so as to have a feed-surface side and an opposite permeate exit side. The enclosure is constructed so as to enable the feed stream mixture to be brought into contact with the membrane feed-surface side. Conduit means are provided for the removal of the part of the feed stream that did not permeate through the membrane, and for the separate removal of the permeate components that have passed through the membrane.

In conducting fluid separations, including concentrations, employing the composite membranes of the present invention, the exit side of the membrane is maintained at a lower thermodynamic potential for at least one permeating component than the thermodynamic potential at the feed side. The driving force for the desired permeation through the membrane is a differential in thermodynamic potential across the membrane, for instance, as provided by a differential in partial pressure. Permeating components pass into and through the membrane and can be removed from the vicinity of the exit side of the membrane to maintain the desired driving force for the permeating fluid. The functionality of the membrane does not depend upon the direction of feed flow or the surface of the membrane which is first contacted by the fluid feed mixture.

The present invention can advantageously be employed in a wide variety of practical commercial operations, such as air separation, the recovery of hydrogen from ammonia purqe gas and from refinery streams, carbon dioxide and methane separations in a variety of operations, hydrogen removal from a mixture of hydrogen and methane, or hydrogen removal from a mixture of nitrogen and methane, and the like. In all such embodiments, it will be appreciated that the separation layer primarily determines the separation characteristics of the composite membranes and that it will be selected for its desired selectivity with respect to the fluid mixture desired to be separated and/or concentrated, and that the support layer will also be selected for its overall convenience and combination of permeablity characteristics as it pertains to any given separation.

By means of the present invention, a membrane forming material is provided which may be used as a separation layer coatinq in a composite membrane, which coating unexpectedly and desirably possesses the most desirable characteristics of each of the materials which comprise this coating. In other words, the coating possesses the best characteristics of the poly(methyl methacrylate) or copolymer thereof and the cellulosic derivatives which are used to form the coating blend. Accordingly, this membrane forming material has the advantage of being able to consistently form continuous, flexible films substantially free from voids and pinholes which, when used as a coating layer, results in composite membranes having substantially enhanced selectivity, flux and permeation rates.

As used herein, it will be understood that the selectivity, or separation factor, of a membrane or membrane module assembly represents the ratio of the permeate rate of the more permeable to the less permeable component of a mixture being separated which permeability is expressed in $ft^3(STP)/ft^2 \cdot day \cdot psi$.

The invention is hereinafter further described with respect to various illustrative examples of the practice thereof. It should be understood, however, that such examples should not be construed as limiting the scope of the invention which is set forth in the appended claims.

EXAMPLE 1

A composite hollow fiber membrane is prepared by coating polysulfone hollow fibers with a blend of poly(methyl methacrylate) and cellulose acetate.

The polysulfone hollow fibers are spun from a polysulfone dope solution, quenched, washed and dried following the Cabasso et al. techniques referred to above.

A solution of poly(methyl methacrylate) is prepared by dissolving 0.7% by weight poly(methyl methacrylate), Polyscience (MW 75000), in acetic acid/isopropanol mixture (50/50% by volume). solution of cellulose acetate is prepared by dissolving 0.7% by weight cellulose acetate (CA 398-10) obtained from Eastman Chemical Products Inc., in acetic acid/isopropanol (50/50% by volume). The poly(methyl methacrylate) solution and the cellulose acetate solution are then added together (50/50% by volume) and filtered through a 1.5 micron glass filter.

The polysulfone hollow fibers are coated by the fiber passing through the coating solution. The thusly coated fibers are then passed through a drier oven prior to being taken up on a winder. The coating and drying sequence is further described in Coplan et al., U.S. 4,467,001, the contents of which are incorporated herein by reference.

A hollow fiber separatory module is constructed utilizinq an annulus of said hollow fibers with the open ends thereof encased in a potting compound and a collection chamber communicating with said open ends adjacent to said potting compound. Further details relating to said separatory module are contained in the Coplan, et al. patent, U.S. 4,207,192, the contents of which are incorporated herein by reference.

The thusly prepared composite membrane is tested for its gas separation characteristics aqainst a mixed gas feed of 70% hydrogen and 30% nitrogen at 200 psiq and 25° C. The following gas separation characteristics are exhibited: the separation factor between hydrogen and nitrogen is 125 and the permeation rate of hydrogen is 0.60 ft$^3$(STP)/ft$^2$ ·day·psi:

EXAMPLE 2

Example 1 is repeated with the exception being that the polysulfone substrate is first annealed prior to it being coated with a blend of poly(methy-1 methacrylate) and cellulose acetate.

The polysulfone fibers are annealed by passing the fibers through a hot-air oven maintained at a temperature of 182° C for a period of 10 seconds.

The annealed fibers are then coated in a manner set forth in Example 1 with the solution comprised of poly(methyl methacrylate) and cellulose acetate resulting in the following gas separation characteristics: the separation factor between hydrogen and nitrogen is 140 and the permeation rate of hydrogen is 1.0 ft $^3$(STP)/ft$^2$ ·day·psi.

EXAMPLE 3

(Comparative Example)

Example 2 is repeated with the exception being that instead of using a blend of poly(methyl methacrylate) and cellulose acetate, only cellulose acetate is coated onto the polysulfone hollow fibers.

In this comparison example, which is not in accordance with the present invention, the thusly prepared composite membrane is tested for its gas separation characteristics aqainst the same mixed gas feed as described in Example 2, namely 70% hydrogen and 30% nitrogen at 200 psiq and 25° C. The following gas separation characteristics are exhibited: the separation factor between hydrogen and nitrogen is 80 and the permeation rate of hydrogen is 1.0 ft $^3$(STP)/ft$^2$ ·day·psi.

EXAMPLE 4

(Comparative Example)

Example 2 is repeated with the exception being that instead of using a blend of poly(methyl methacrylate) and cellulose acetate, only poly(methyl methacrylate) is coated onto the polysulfone hollow fibers.

In this comparison example, which is not in accordance with the present invention, the thusly prepared composite membrane is tested for its gas separation characteristics against the same mixed gas feed of Example 2, namely 70% hydrogen and 30% nitrogen at 200 psiq and 25° C. The following gas separation characteristics are exhibited: the separation factor between hydrogen and nitrogen is 224 and the permeation rate of hydrogen is 0.59 ft$^3$ STP)/ft$^2$·day·psi.

It is further noted that composite membranes prepared by coatinq poly(methyl methcrylate) on a substrate are difficult to reproduce due to the occurrence of defects and its inherent brittleness.

EXAMPLE 5

Example 2 is repeated with the exception being that instead of using a blend of poly(methyl methacrylate) and cellulose acetate in a solution of 50% acetic acid/50% isopropanol (50/50% by volume), a blend of poly (methyl methacrylate) and cellulose acetate in a solution of nitromethane is used.

The annealed fibers are then coated in a manner set forth in Example 2 with poly (methyl methacrylate) and cellulose acetate. The thusly prepared composite membrane is tested for its gas separation characteristics against the same mixed gas feed of Example 2, namely 70% hydrogen and 30% nitrogen at 200 psiq and 25° C. The following gas separation characteristics are exhibited; the separation factor between hydrogen and nitrogen is 144 and the permeation rate of hydrogen is 0.8 ft$^3$(STP)/ft$^2$·day·psi.

What is claimed is:

1. A composite membrane capable of selectively permeating at least one more readily permeable gaseous component from a gaseous feed mixture containing said component, and utilizing the high selectivity characteristics of poly(methyl) methacrylate) without the corresponding low permeability characteristics thereof, comprising:
    (a) a porous support layer that serves to provide support for a thin separation layer positioned thereon, said porous substrate having substantially no gas separation characteristics with respect to said gaseous feed mixture; and
    (b) an essentially non-porous gas separation layer positioned on said porous support layer, said separation layer that substantially determines the separation characteristics of the composite gas membrane being comprised of a mixture of poly(methyl methacrylate) or a copolymer thereof containing at least 50% by weight of poly(methyl methacrylate) and at least one cellulosic derivative, the proportions of said materials being selected so as to match the high separation characteristics provided by said poly(methyl methacrylate) and the high permeation characteristics provided by said cellulosic derivative to provide a particular, uniquely complementing combination of high gas separation and permeability for the separation of a particular gaseous feed mixture, whereby said composite membrane exhibits an enhanced combination of gas separation and permeability characteristics.

2. The composite membrane of claim 1, wherein the ratio by weight of the poly(methyl methacrylate) or copolymer thereof to the cellulose derivative is from about 10:90 to about 90:10.

3. The composite membrane of claim 2, wherein the ratio is from about 30:70 to about 70:30.

4. The composite membrane of claim 2, wherein the ratio is about 50:50.

5. The composite membrane of claim 1, wherein the copolymer is comprised of methyl methacrylate and ethyl methacrylate monomer units.

6. The composite membrane of claim 1, wherein the copolymer is comprised of methyl methacrylate and n-butyl methacrylate monomer units.

7. The composite membrane of claim 1, wherein the copolymer is comprised of methyl methacrylate and iso-butyl methacrylate monomer units.

8. The composite membrane of claim 1, wherein the cellulosic derivative is selected from the group consisting of cellulose acetate, cellulose acetate butyrate, cellulose propionate, cellulose butyrate, cellulose acetate propionate, and mixtures thereof.

9. The composite membrane of claim 8, wherein the cellulosic derivative is cellulose acetate.

10. The composite membrane of claim 9, wherein the cellulose acetate has a degree of acetylation of qreater than 2.0.

11. The composite membrane of claim 1, wherein the thickness of the separation layer is less than about 0.4 microns 12. The composite membrane of claim 1, wherein the thickness is from about 0.05 to about 2 microns.

13. The composite membrane of claim 1, wherein the support layer comprises a polymeric material.

14. The composite membrane of claim 13, wherein the support layer comprises at least one of polysulfone, polyolefins, polyphenylenesulfide, polyether ketone, polyam-ides and polyimides 15. The composite membrane of claim 13, wherein the support layer is polysulfone.

16. The composite membrane of claim 23 in which said porous substrate is an annealed polymeric material.

17. The composite membrane of claim 68 in which the annealed polymeric material substrate is in asymmetric form having a porous, non-selective support region comprising said porous support layer and a dense, semipermeable skin region.

18. The composite membrane of claim 1, wherein the cellulosic derivative of the separation layer comprises cellulose acetate and the support layer comprises polysulfone.

19. The composite membrane of claim 1, wherein the composite membrane is in hollow fiber form.

20. A process for the preparation of a composite membrane capable of selectively permeating at least one more readily permeable component from a gaseous feed mixture containing said component, and utilizing the high selectivity characteristics of poly(methyl methacrylate) without the corresponding low permeability characteristics thereof, comprising:

(a) providing a porous support layer to provide support for a thin separation layer to be positioned thereon, said porous support layer having substantially no gas separation characteristics with respect to said gaseous feed mixture;

(b) providing a solution containing a mixture of poly(methyl methacrylate) or a copolymer thereof containing at least 50% by weight of poly(methyl methacrylate), at least one cellulosic derivative and a solvent therefor, which solvent is a non-solvent for the porous support layer;

(c) coating the porous support layer with said solution to provide an essentially non-porous gas separation layer on said porous support layer; and (d) drying said separation layer on the porous support layer to form the desired composite membrane, said non-porous gas separation layer substantially determining the gas separation characteristics of the composite membrane, the proportions of said materials being selected so as to match the high separation characteristics provided by said poly(methyl methacrylate) and the high permeation characteristics provided by said cellulosic derivative to provide a particular, uniquely complementing combination of high gas separation and permeability for the separation of a particular gaseous feed mixture, whereby composite membranes that exhibit an enhanced combination of gas separation and permeability characteristics can be readily prepared for use in desirable gas separation operations.

21. The process of claim 20, wherein the ratio by volume of poly(methyl methacrylate) or copolymer thereof to cellulose derivative in solution is from about 70:30 to about 30:70.

22. The process of claim 20, wherein the solvent for the solution includes a mixture of acetic acid and isopropanol; a mixture of acetic acid, a $C_1$–$C_4$ aliphatic alcohol and water; nitromethane; a mixture of nitromethane and a $C_1$–$C_4$ aliphatic alcohol; acetone; or a mixture of acetone and a $C_1$–$C_4$ aliphatic alcohol; or a mixture of acetone, a $C_1$–$C_4$ aliphatic alcohol and water; wherein the support layer is polysulfone.

23. The process of claim 20, wherein the solvent for the solution includes a mixture of acetic acid, isopropanol and water when the support layer is polysulfone.

24. The process of claim 20, wherein the cellulosic derivative is selected from the group consisting of cellulose acetate, cellulose acetate butyrate, cellulose propionate, cellulose butyrate, cellulose acetate propionate, and mixtures thereof.

25. The process of claim 24, wherein the cellulosic derivative is cellulose acetate.

26. The process of claim 25, wherein the cellulose acetate has a degree of acetylation that is greater than 2.0.

27. The process of claim 20, wherein the copolymer is comprised of methyl methacrylate and ethyl methacrylate monomer units.

28. The process of claim 20, wherein the copolymer is comprised of methyl methacrylate and n-butyl methacrylate monomer units.

29. The process of claim 20, wherein the copolymer is comprised of methyl methacrylate and iso-butyl methacrylate monomer units.

30. The process of claim 20, wherein the thickness of the separating layer is less than about 0.4 microns.

31. The process of claim 20, wherein the thickness of the separatinq layer is from about 0.05 to about 0.2 microns.

32. The process of claim 20, wherein the support layer comprises a polymeric material.

33. The process of claim 41 in which said porous substrate is an annealed polymeric material.

34. The process of claim 71 in which said porous substrate comprises a polymeric material having a glass transition temperature about 100° C., said polymeric material being annealed at a temperature close to its glass transition temperature for a short time under non-solvent and non-swelling conditions, the annealed substrate being in asymmetric form having a porous, non-selective support region comprising said porous support layer and a dense, semipermeable skin region.

35. The process of claim 32, wherein the support layer comprises at least one of polysulfone, polyolefins, polyphenylenesulfide, polyether ketone, polyamides and polyimides.

36. The process of claim 42, wherein the support layer is polysulfone.

37. The process of claim 20, wherein the cellulose derivative of the separation layer comprises cellulose acetate and the support layer comprises polysulfone.

38. The process of claim 20, wherein the composite membrane is in hollow fiber form.

39. A method for separating at least one more readily permeable gaseous component from a gaseous feed mixture containing said component, and utilizing the high selectivity characteristics of poly(methyl methacrylate) without the corresponding low permeability characteristics thereof, comprising:
(a) contacting said gaseous feed mixture with one surface of a composite membrane capable of selectively permeating said more readily permeable gaseous component, said composite membrane comprising (1) a porous support layer that serves to provide support for a thin separation layer positioned thereon, said porous substrate having substantially no gas separation characteristics with respect to said gaseous feed mixture, and (2) an essentially non-porous gas separation layer positioned on said porous support layer, said separation layer that substantially determines the separation characteristics of the composite membrane being comprised of a mixture of poly(methyl methacrylate) or a copolymer thereof containing at least 50% by weight of poly(methyl methacrylate) and at least one cellulosic derivative, the proportions of said materials being selected so as to match the high separation characteristics provided by said poly(methyl methacrylate) and the high permeation characteristics provided by said cellulosic derivative to provide a particular, uniquely complementing combination of high gas separation and permeability for the separation of a particular gaseous feed mixture, the more permeable gas component selectively permeating in and through said composite membrane; and
(b) removing from the vicinity of the opposite surface of the composite membrane said more readily permeable component as permeate gas having a greater proportion of said more permeable component than is present in said gaseous feed mixture, whereby the gas separation method is enhanced by the desirable combination of gas separation and permeability characteristics of said composite membrane.

40. The method of claim 39, wherein the said at least one gas comprises hydrogen and the gas mixture comprises hydrogen and nitrogen.

41. The method of claim 39 wherein the said at least one gas comprises hydrogen and the gas mixture comprises hydrogen and methane..

42. The method of claim 39, wherein the said at least one gas comprises carbon dioxide and the gas mixture comprises carbon dioxide and methane.

43. The method of claim 39, wherein the said at least one gas comprises nitrogen and the gas mixture comprises nitrogen and methane.

44. The method of claim 39, wherein the said at least one gas comprises oxygen and the gas mixture comprises air.

45. The method of claim 39, wherein the ratio by weight of poly(methyl methacrylate) or copolymer thereof to cellulosic derivative is from about 10:90 to about 90:10.

46. The method of claim 39, wherein the copolymer is comprised of methyl methacrylate and ethyl methacrylate monomer units.

47. The method of claim 39, wherein the copolymer is comprised of methyl methacrylate and n-butyl methacrylate monomer units.

48. The method of claim 39, wherein the copolymer is comprised of methyl methacrylate and iso-butyl methacrylate monomer units.

49. The method of claim 39, wherein the cellulosic derivative is selected from the group consisting of cellulose acetate, cellulose acetate butyrate, cellulose propionate, cellulose butyrate, cellulose acetate propionate, and mixtures thereof.

50. The method of claim 39, wherein the cellulosic derivative is cellulose acetate.

51. The method of claim 50, wherein the cellulose acetate has a degree of acetylation greater than 2.0.

52. The method of claim 39, wherein the thickness of the separating layer is less than about 0.4 microns.

53. The method of claim 39, wherein the support layer comprises a polymeric material.

54. The method of claim 53, wherein the support layer comprises at least one of polysulfone, polyolefins, polyphenylenesulfide, polyether ketone, polyamides and polyimides.

55. The method of claim 53, wherein the support layer is polysulfone.

56. The method of claim 39, wherein the cellulosic derivative of the separation layer comprises cellulose acetate and the support layer comprises polysulfone.

57. The method of claim 39, wherein the composite membrane is a hollow fiber form.

58. The method of claim 53, wherein the substrate is an annealed polymeric material.

59. The method of claim 73 in which said porous substrate is an annealed polymeric material.

60. The method of claim 74 in which the annealed polymeric material substrate is an asymmetric form having a porous, non-selective support region comprising said porous support layer and a dense, semipermeable skin region.

* * * * *